United States Patent [19]
Bietry

[11] Patent Number: 5,646,788
[45] Date of Patent: Jul. 8, 1997

[54] DUAL APERTURE LENS

[75] Inventor: Joseph R. Bietry, Rochester, N.Y.

[73] Assignee: Eastman Kodak Company, Rochester, N.Y.

[21] Appl. No.: 417,166

[22] Filed: Apr. 6, 1995

[51] Int. Cl.[6] ................................................. G02B 9/00
[52] U.S. Cl. ............................................................ 359/740
[58] Field of Search ..................................... 359/739, 740

[56] References Cited

U.S. PATENT DOCUMENTS

| | | | |
|---|---|---|---|
| 2,142,297 | 1/1939 | Albersheim | 33/24 |
| 2,855,824 | 10/1958 | Schade | 359/739 |
| 3,018,689 | 1/1962 | Saxe | 88/57 |
| 4,196,969 | 4/1980 | Itoh | 359/739 |
| 4,319,809 | 3/1982 | Abel . | |
| 4,705,363 | 11/1987 | Ikemori | 350/427 |
| 5,032,011 | 7/1991 | Muchel | 350/416 |
| 5,035,492 | 7/1991 | Ito | 350/423 |
| 5,153,777 | 10/1992 | Okada et al. | 359/692 |
| 5,161,233 | 11/1992 | Matsuo et al. . | |
| 5,172,275 | 12/1992 | DeJager . | |
| 5,182,673 | 1/1993 | Kikuchi et al. | 359/691 |

FOREIGN PATENT DOCUMENTS

| | | |
|---|---|---|
| 404125516 | 4/1992 | Japan . |
| 404311912 | 11/1992 | Japan . |

*Primary Examiner*—Scott J. Sugarman
*Attorney, Agent, or Firm*—Svetlana Z. Short

[57] ABSTRACT

A variable aperture lens has a fixed aperture stop inside the lens and a variable aperture stop located outside the lens. When the lens is operated at its widest effective aperture, the effective aperture is defined by the fixed aperture stop. When it is operated at its narrowest effective aperture, the effective aperture is defined by the variable aperture stop. This permits highest corrections for the widest aperture but with a lens that is free of the cleaning and other difficulties of a variable interior aperture.

6 Claims, 1 Drawing Sheet

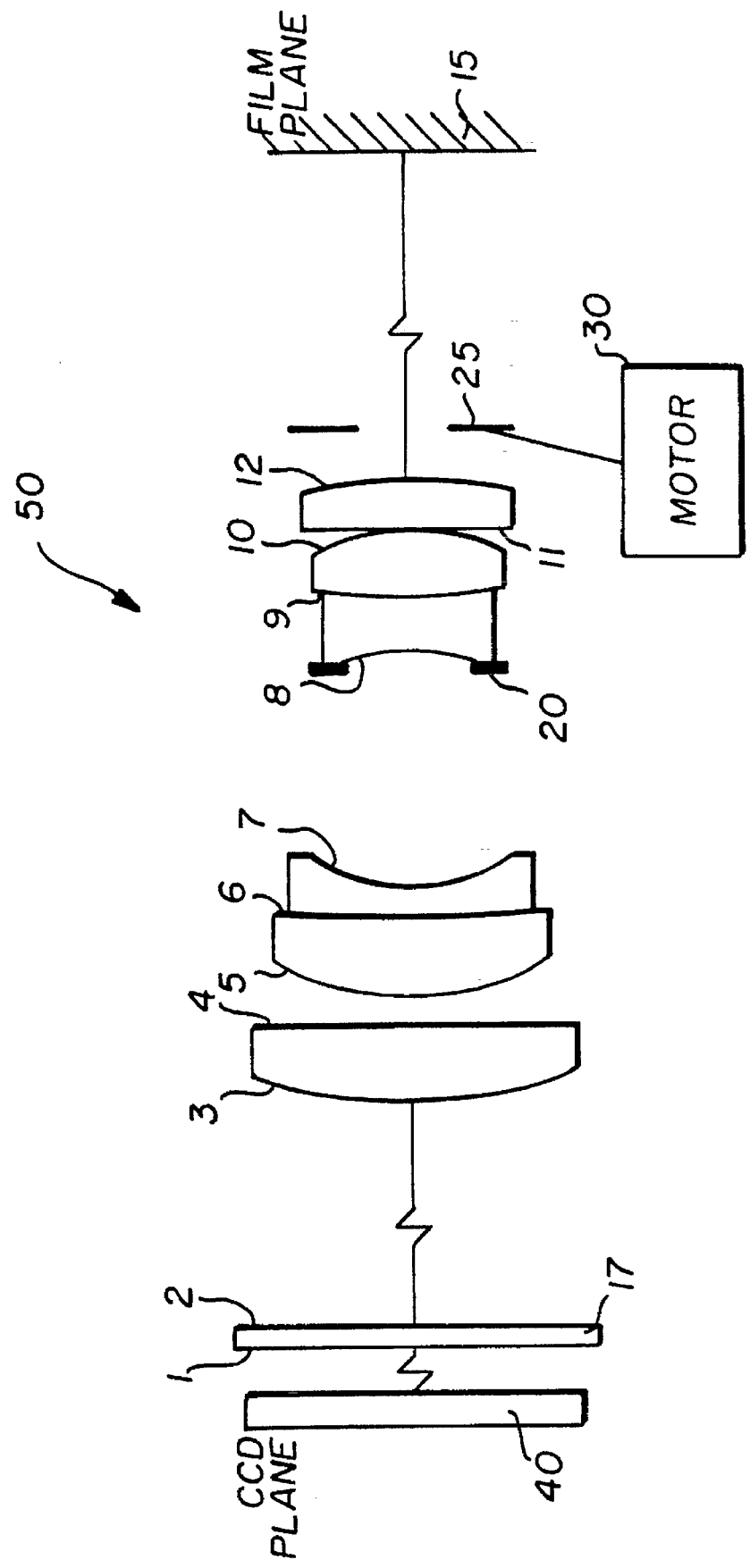

DUAL APERTURE LENS

This invention relates to an objective lens and, more particularly, an objective lens usable at at least two effective apertures. Although not limited thereto, the invention is particularly usable for projecting an image of color film onto an image plane, for example, onto a CCD array.

Most lens designs have their aperture stops located inside the lens. That is, there are lens components on both sides of the stop. This is particularly true of double Gauss-type lenses. Such lenses generally include a substantial central air space in which is located the aperture stop, negative doublets on each side of the aperture stop concave to the stop and one or more positive elements outside of each negative doublet. These lenses are generally somewhat symmetrical and rely heavily for their corrections on the centrally located aperture stop.

If the aperture stop is also to be variable, then some moving parts are located inside the lens. This leaves open the possibility of dirt entering the lens system at a place in which it is relatively impossible to clean.

SUMMARY OF THE INVENTION

I attempted to solve this problem by moving the aperture stop on a double Gauss objective outside of the lens so that the integrity of the lens could be maintained but the stop could be made variable. Unfortunately, aberration correction at the widest aperture desired proved difficult with this type of design.

However, I did find that lenses could be designed with a wide effective aperture using a fixed internal aperture stop and a narrow effective aperture stop using an external aperture stop that is variable, which lens provides high performance at both apertures.

Although this principle can be applied to other types of lenses, according to a preferred embodiment, it is particularly usable with a double Gauss type lens which includes a central air space with first and second negative doublets concave to the air space defining the air space. Preferably, the internal fixed aperture stop is close to or at the interior surface of one of the negative doublets, and the variable aperture stop is outside of the lens on the same side of the fixed aperture stop as that one negative doublet.

According to another preferred embodiment, the invention is particularly usable in projecting an image of either color negative film or slide film onto an image plane, for example, an image plane defined by a CCD array. The color negative film is more dense than slide film and requires, therefore, a wider effective aperture to provide the same density of image in the image plane.

The invention provides a lens with remarkable corrections at its widest effective aperture and with a very good narrower aperture without the cleaning problems of a variable central aperture.

BRIEF DESCRIPTION OF THE DRAWINGS

The FIGURE is a side schematic of a lens positioned in a color film scanner.

DETAILED DESCRIPTION OF THE INVENTION

The FIGURE shows an objective lens 50 positioned to project an image of an original 15 located in an object plane onto a receiving surface, for example, a CCD array 40 located at an image plane. A plain glass plate 17 is positioned between the image plane and the lens 50. Lens 50 includes six elements arranged in a generally double Gauss design. From the image plane toward the object plane it includes a positive element, a first negative doublet, a second negative doublet and a positive element. The negative doublets are concave toward each other defining a central air space in which is located a fixed aperture stop 20. Fixed aperture stop 20 is preferably within 2 millimeters of the second negative doublet. Even more preferably, it is within half a millimeter of the second negative doublet. In this specific example, which will be disclosed more thoroughly in Table 1 below, the fixed aperture stop 20 adjoins the inner surface of the second negative doublet. A variable aperture stop 25 is positioned between the lens 50 and the original 15. It is on the same side of the fixed aperture stop 20 as the second doublet which adjoins stop 20. The variable aperture stop 25 is adjustable by a motor 30. It can be adjusted between two finite sizes, a wide and a narrow size, or it can be adjustable between more than two sizes.

This lens was designed to project an image of both color negative and slide film onto a CCD array in a color film scanner. Color negative fill is more dense than color slide fill and generally requires more light to provide comparable imaging in the image plane. For this application, the variable aperture stop 25 is adjustable between a narrow position in which it defines a narrow effective aperture for the lens 50 and a wide position in which the fixed aperture 20 stop defines a wide effective aperture for lens 50 and variable aperture stop 25 does not define the effective aperture of lens 50.

This design is effective because the lens is capable of being corrected for the wide aperture using the central stop, while the advantages to corrections gained by stopping down the camera to the narrower aperture allow the use of the exterior aperture stop 25 for that function. Thus, the lens provides excellent corrections at the wide aperture and the narrow aperture without making the interior aperture stop adjustable.

This particular design is set out in more detail in Tables 1 and 2 in which lens surfaces, as shown in the FIGURE are numbered from 1 to 12, all distances are in millimeters, the indices of refraction of the glasses are for the sodium D-line of the spectrum and the V denotes the abbe number for the glasses:

EXAMPLE

TABLE 1

| Surface | Radius | Thickness | Index | V-Number |
| --- | --- | --- | --- | --- |
| 1 | PLANO | 0.762 | 1.531 | 62.1 |
| 2 | PLANO | 60.459 | | |
| 3 | 22.0597 | 2.679 | 1.620 | 63.5 |
| 4 | 128.182 | 1.299 | | |
| 5 | 11.3856 | 3.139 | 1.620 | 63.5 |
| 6 | 48.3234 | 1.250 | 1.613 | 44.3 |
| 7 | 7.42510 | 9.270 | | |
| 8 | −7.89330 | 2.199 | 1.613 | 44.3 |
| 9 | 31.2365 | 2.471 | 1.620 | 63.5 |
| 10 | −10.1979 | 0.100 | | |
| 11 | −133.511 | 1.907 | 1.620 | 63.5 |
| 12 | −20.4777 | | | |

This lens is used at F/8.09 with the variable aperture stop 25 set sufficiently wide (or removed) that it is not restricting, and the effective aperture of the lens is defined by the fixed aperture stop 20. This setting is used, for example, for a color negative original which is typically dense. The lens is used at F/12.94 with the variable aperture stop 25 closed down to its narrow position, where it defines the effective aperture of the lens. This setting is used, for example, for a color slide original which is typically less dense.

Corrections at the narrow aperture setting are adversely affected by the location of stop 25, but this is largely compensated for by the narrowness of the aperture, making the performance at the two settings both reasonably comparable and excellent (as will be seen from Table 2). The lens is especially well corrected for lateral color.

In Table 2, the modulation transfer function (MTF) is provided at a single plane of best compromise focus for each color at 44 L/MM with equal weights for wavelengths (in microns) 0.540, 0.526, 0.567 (green); 0.453, 0.429, 0.474 (Blue); and 0.663, 0.628, 0.698 (red). The slash denotes the tangential/radial MTF:

TABLE 2

|  | Axis | 8.14 MM | 11.50 MM |
|---|---|---|---|
| | | EFFECTIVE F/8.09 | |
| Green | .74 | .73/.73 | .69/.74 |
| Blue | .62 | .59/.61 | .40/.49 |
| Red | .70 | .70/.70 | .59/.68 |
| | | EFFECTIVE F/12.94 | |
| Green | .60 | .58/.58 | .55/.59 |
| Blue | .63 | .57/.64 | .41/.59 |
| Red | .51 | .50/.51 | .43/.50 |

The invention has been described in detail with particular reference to a preferred embodiment thereof, but it will be understood that variations and modifications can be effected within the spirit and that variations and modifications can be effected within the spirit and scope of the invention as described hereinabove and as defined in the appended claims.

I claim:

1. A variable aperture lens system having a variable effective aperture and a plurality of components, said lens system comprising:

a fixed aperture stop located inside the lens system, a variable aperture stop variable between at least wide and narrow positions and located outside the lens system, the lens system is being generally of the double Gauss type and including a central air space with first and second negative doublets, concave to the central air space; and the powers and spacings of the components with respect to the aperture stops being such that the effective aperture of the lens system is defined by the fixed aperture stop for a first wide effective aperture when the variable aperture stop is in its wide position and the effective aperture of the lens system is defined by the variable aperture stop when the variable aperture stop is in its narrow position.

2. A variable aperture lens system according to claim 1 wherein the variable aperture stop is located on a first side of the lens system and the fixed aperture stop is located within 2 millimeters of the negative doublet on the same side of the air space as the variable aperture stop.

3. A variable aperture lens system according to claim 2 wherein said fixed aperture stop is within 0.5 millimeters of the negative doublet on the same side of the air space as the variable aperture stop.

4. A color scanner having means for alternatively receiving a color negative or slide original in an object plane and a variable aperture lens system for projecting an image of the color negative or slide onto an image plane wherein the variable aperture lens system is constructed according to claim 1.

5. A color scanner according to claim 4 further including a CCD array positioned in the image plane.

6. A variable aperture lens system according to claim 1 further defined by the following table in which lens surfaces are numbered from 1 to 12, radii and thicknesses are in millimeters, indices of refraction are for the D-line of the spectrum and V is the abbe number for glasses:

| Surface | Radius | Thickness | Index | V-Number |
|---|---|---|---|---|
| 1 | PLANO | 0.762 | 1.531 | 62.1 |
| 2 | PLANO | 60.459 | | |
| 3 | 22.0597 | 2.679 | 1.620 | 63.5 |
| 4 | 128.182 | 1.299 | | |
| 5 | 11.3856 | 3.139 | 1.620 | 63.5 |
| 6 | 48.3234 | 1.250 | 1.613 | 44.3 |
| 7 | 7.42510 | 9.270 | | |
| 8 | −7.89330 | 2.199 | 1.613 | 44.3 |
| 9 | 31.2365 | 2.471 | 1.620 | 63.5 |
| 10 | −10.1979 | 0.100 | | |
| 11 | −133.511 | 1.907 | 1.620 | 63.5 |
| 12 | −20.4777 | | | | and in which the fixed aperture stop is positioned adjacent surface 8 and the variable aperture stop is positioned 2 millimeters from surface 12.

* * * * *